UNITED STATES PATENT OFFICE.

CARL SCHEIBLER, OF BERLIN, GERMANY.

METHOD OF SEPARATING SUGAR FROM MOLASSES, &c.

SPECIFICATION forming part of Letters Patent No. 260,244, dated June 27, 1882.

Application filed May 27, 1882. (No specimens.)

*To all whom it may concern:*

Be it known that I, CARL SCHEIBLER, doctor of philosophy and professor, residing in the city of Berlin, Germany, have invented a new Method of Separating Sugar from Molasses and Sirups by the Production of Saccharate of Strontia at Low Temperatures, of which the following is a specification.

The process forming the subject-matter of my invention is based on the following hitherto-unknown chemical reactions. When a solution of pure cane-sugar containing from twenty to twenty-five per cent. of sugar and heated to about 70° or 75° centigrade is mixed, by constant stirring, with hydrate of strontia, $Sr(OH)_2+8H_2O$, in the proportion of one molecule of sugar to one molecule of the said hydrate, the latter dissolves completely and without any separation of a saccharate, only the solution will generally be turbid from a small quantity of carbonate of strontia unavoidably produced. If this liquid is filtered in warm state, and then allowed to cool while being prevented from absorbing carbonic acid, a highly-supersaturated solution of monobasic saccharate of strontia will be formed. This monosaccharate is, under ordinary conditions, but little soluble, as one part of the same requires twenty parts of water for dissolving it; but the concentrated solution thereof, prepared with hot water, may, after having cooled down to the ordinary temperature of the air, subsist unchanged for a certain time, and without any separation taking place. This supersaturated solution of monosaccharate of strontia will present a peculiar difference of behavior under different circumstances. Either will hydrate of strontia in unchanged state crystallize out therefrom or a gradual separating out of monobasic saccharate of strontia takes place after some time. The crystallization or the separation may be caused at will. Thus, if crystals of hydrate of strontia are thrown into the supersaturated solution the same substance will crystallize out unchanged, whereas when a small quantity of monosaccharate of strontia previously prepared is added to the solution the crystallization of a further quantity of this compound is caused. The said monosaccharate forms papillary masses, which grow into cauliflower-like aggregations, subsequently dropping into a fine-grained white powder, especially when the mass is stirred or shaken. The saccharate of strontia may also be formed in the "cold way" by introducing the requisite quantity of hydrate of strontia in finely-powdered state into a cold solution of sugar and stirring constantly. The particles of strontia will in this case gradually attract the sugar and unite with the same to form the monosaccharate. The process is to best advantage carried out by means of the fine flour-of-strontia crystals obtained by the so-called "disturbed crystallization," which takes place when a hot solution of strontia is constantly agitated by stirring until it has become cold. The formation of the saccharate in the cold way is particularly adapted when sugar is to be obtained from molasses produced in the manufacture of raw sugar from cane, and containing a considerable quantity of inverted sugar. This will be explained more fully hereinafter.

Upon the described properties of the monosaccharate I have based the following practical process of separating saccharate of strontia from molasses or sirup.

Supposing molasses containing fifty per cent. of sugar were to be treated, then one kilogram thereof, in which there will be five hundred grams of sugar, would require three hundred and eighty-nine grams of crystallized hydrate of strontia, $Sr(OH)_2+8H_2O$, for converting all the sugar into monosaccharate of strontia. It is, however, preferable to employ so much more hydrate of strontia that the mother-lye or solution of foreign substances remaining after the separation of the saccharate may be saturated with strontia.

Instead of three hundred and eighty-nine grams of the strontic crystals, five hundred grams, or, in general, a quantity equal to the weight of the sugar, may be taken. There will then be one molecule of sugar to one and one-fourth molecule of crystallized hydrate of strontia. This excess of strontia is, however, not absolutely required, and it may be varied, if desired. Besides, it is to be observed that the same is subsequently reobtained, and does not therefore constitute any loss.

For dissolving five hundred grams of hydrate of strontia about fifteen hundred grams of water of a temperature of 89° or 90° centigrade are required. This leads to the following simple proportion between the materials to be employed, and which has been found advantageous in practice, but which, nevertheless, may be varied, if required. To each kilogram of molasses is added, under constant stirring, one-half kilogram of crystals of strontia previously dissolved in one and one-half kilogram of water having a temperature somewhat below the boiling-point. When this mixture of the hot solution with the cold molasses takes place the latter speedily dissolves while the temperature is reduced, so that no bibasic saccharate of strontia (which is only formed at the boiling-temperature) is produced. The mixture remains clear, in so far as it is not troubled by foreign substances separating out, such as carbonate and sulphate of strontia, &c. The molasses may also first be thinned by a certain quantity of water before it is mixed with the hot strontic solution; or the molasses is mixed with the whole quantity of water, the mixture heated to about 80° centigrade, and subsequently the crystallized hydrate of strontia added thereto in solid state while the liquid is stirred. The latter mode of operating would, however, require the hydrate of strontia to be prepared in crystallized form, whereas in the other method of proceeding the hot lyes obtained by slaking recently-burned strontia anhydride may be used directly, as the titre of these lyes may with facility be determined by the aerometer. Another mode of proceeding consists in introducing into the mixture of molasses with water anhydrous caustic strontia taken from the calcining-furnace and finely powdered. The same will be slaked in the liquid while the saccharate is formed. In whichsoever manner the process may have been carried out, the liquor containing the strontic saccharate is either allowed to cool spontaneously or it is refrigerated by any known artificial means or apparatus. During this cooling no saccharate separates out. On the contrary, strontic hydrate in unchanged condition would crystallize out from the liquor when cold and if left undisturbed; but if the liquor is stirred continuously or from time to time, and especially if a small quantity of saccharate from a previous process is distributed therein, the separation of the saccharate immediately commences and continues, and is generally finished in twelve to twenty-four hours. The liquor has then become a stiff mass, which, when being stirred, reliquidates to a thick pulp. The latter consists of the saccharate, and, in case strontic hydrate had been added in considerable excess, of crystals thereof, both saturated with a mother-lye consisting of the solution of foreign substances, together with strontia. The saccharate is separated from the lye in any known manner—i. e., by means of filter-presses, vacuum-filters, centrifugal machines, &c.—and is thereupon lixiviated by means of water or by a cold saturated solution of hydrate of strontia. In purified state the saccharate is perfectly white. From the bibasic saccharate precipitated at the boiling-temperature it differs substantially by its far greater purity, which is such that on being decomposed by carbonic acid it yields a completely-colorless solution of sugar, which requires no filtration over bone-charcoal.

As has already been observed, the saccharate produced at low temperature is not quite insoluble. For this reason not all the sugar contained in the molasses or the sirup is obtained in the saccharate, but only a part thereof. Under the above conditions the yield will be from about two thirds to three-fourths of the total amount of sugar, while the rest remains in the mother-lye and in the lixiviating liquid. The yield of saccharate, however, increases with the length of time which the mixture is left to stand before the saccharate is separated from the mother-lye. The said yield of but about two-thirds or three fourths of all the sugar contained in the molasses or the sirup is of course too low to allow the process to be claimed as a perfect one; but it is not difficult to obtain the greater part of the remaining third or quarter also, so that then the total quantity of sugar produced in the form of saccharate will amount to about ninety-six or ninety-seven per cent. of the entire quantity present. For this purpose I proceed as follows: The lye separated from the saccharate, and to which is added the lixiviating liquid, is mixed with crystallized hydrate of strontia and boiled until the sugar has separated out in the form of bibasic saccharate. The hydrate of strontia must in this case be employed in such excess that the lye remaining after complete separation of the bibasic saccharate may contain a considerable quantity of strontia. The precipitate bibasic saccharate need not, however, be freed by filtration from the mother-lye nor lixiviated, as this would be superfluous; but the boiling and stirring having been finished it is allowed to settle either in the precipitating-vessel or in any other receptacle, whereupon the lye or solution of foreign substances is separated from the precipitate in known manner by drawing it off through a cock placed at a suitable height, or a siphon, &c. From this lye, when cold, brown-colored crystals of hydrate of strontia are deposited, which may be reutilized in the following operations. The strontia then still contained in solution, and part of which is combined with acids, having been precipitated by means of carbonic acid and of an alkalic carbonate in the form of carbonate of strontia, the remaining mother-lye is utilized as manure or for the manufacture of alkali salts, ammonia, &c.

The bibasic saccharate of strontia produced and still impregnated by the mother-lye is utilized by being introduced into and mixed with a new quantity of molasses for the purpose of separating out monosaccharate in a similar manner as hereinbefore described in respect to the hydrate of strontia. The bibasic saccharate, which is yet hot, speedily dissolves in the cold molasses in consequence of the excess of free sugar present in the latter. Hereafter the pulpy mixture, while being stirred, is diluted with so much hot saturated solution of hydrate of strontia that the molecular proportion between the whole quantity of sugar (contained in the molasses and in the bibasic saccharate) and the strontia may be again the same as has hereinbefore been given for the formation of monosaccharate—i. e., as one to about one and one-fourth. The mixture having become cold, the saccharate is separated out and treated, as has already been specified. It is evident that in proceeding in this manner the sugar contained in the residual lyes of the monosaccharate is not lost, but that in the following operation it is returned into the circuit of operations as bibasic saccharate, to be subsequently separated out as monosaccharate. The molasses thus undergoes a complete decomposition into nearly pure monosaccharate on one hand and a residual lye, containing all foreign substances, on the other hand, whereas the loss of sugar is but very slight.

From the purified monosaccharate the sugar may be obtained in different manners:

First. By decomposing by means of carbonic acid the saccharate stirred up in water.

Secondly. By employing the saccharate in combination with a subsequent process of saturation by carbonic acid for defecating the juice of beet-roots, or for carrying out a second purification thereof after the same has been defecated by lime and filtered.

Thirdly. By causing a part of the strontia to crystallize out as hydrate of strontia, $Sr(OH)_2 + 8H_2O$, and precipitating the residue of strontia hereafter remaining in solution by means of carbonic acid. The latter method is based on the particular property of the monosaccharate explained in the introduction, and according to which a part of the hydrate of strontia crystallizes out from solutions of monosaccharate of strontia prepared with hot (but not boiling) water and allowed to cool slowly and without being stirred.

The pure solutions of sugar obtained by either of these methods are treated according to the modes of operation ordinarily employed in sugar-manufactories.

Compared with the method of obtaining sugar from molasses, &c., previously invented by me, and described in the specification of the English Patent, A. D. 1881, No. 331, and also in the Neue Zeitschrift für Rübenzucker-Industrie, Vol. VIII, pp. 6–11, the method specified in the foregoing possesses the following advantages: First, it only requires simple refrigerating apparatuses (by preference apparatuses with counter-currents) instead of the expensive cooling-rooms, cooling-boxes, and cold-air machines which were formerly wanted, as the material to be cooled is not solid, but liquid; second, crystallizing-vats for the hydrate of strontia are either not required at all or they may at least be considerably reduced in size, as instead of the crystallized hydrate a hot saturated solution thereof may be employed immediately after having been prepared; third, about one-third only of the quantity of hydrate of strontia formerly used is required; fourth, in consequence hereof the losses of strontia are less; fifth, the sugar obtained is purer. Moreover, the method presents the advantage, sixth, that it may be applied to molasses obtained in the manufacture of raw sugar from cane, or in the refining of such sugar, provided the amount of inverted sugar contained in such molasses does not exceed certain limits. If the amount of inverted sugar is not very considerable, it need not be taken into account at all; or, if preferred, it may be destroyed by boiling with lime or strontia. When the quantity of inverted sugar is greater the formation of monosaccharate in the cold way, as hereinbefore described, is employed; but in this case the yield of sugar will ordinarily be less, as it is not always possible under such conditions to separate bibasic saccharate at the boiling-temperature from the residual lyes of the monosaccharate, in order to utilize it in the following operation.

I claim as my invention—

1. The method of producing monosaccharate of strontia in molasses and sirup by introducing into the same, while at a temperature below the boiling-point, hydrate of strontia, by cooling the liquor, and by stirring it, in order to effect the formation of the saccharate of strontia at a low temperature and the separation thereof from the liquor, substantially as and for the purpose specified.

2. In combination with the method of producing monosaccharate of strontia in molasses and sirup by introducing into the same, while at a temperature below the boiling-point, hydrate of strontia, by cooling the liquor, and by stirring it, the addition to the liquor of saccharate of strontia previously obtained, in order to promote the separation of the saccharate of strontia formed in the liquor, as hereinbefore specified.

3. In combination, with the process of producing monosaccharate of strontia in molasses and sirup, as hereinbefore described, the treatment of the mother-lye, resulting from such process, by adding thereto an additional quantity of hydrate of strontia and boiling in order to produce bibasic saccharate of strontia, as and for purpose described.

In testimony whereof I have signed my name to this specification in the presence of two subscribing witnesses.

DR. CARL SCHEIBLER.

Witnesses:
HENRY SPRINGMANN,
B. ROI.